Figure 1:
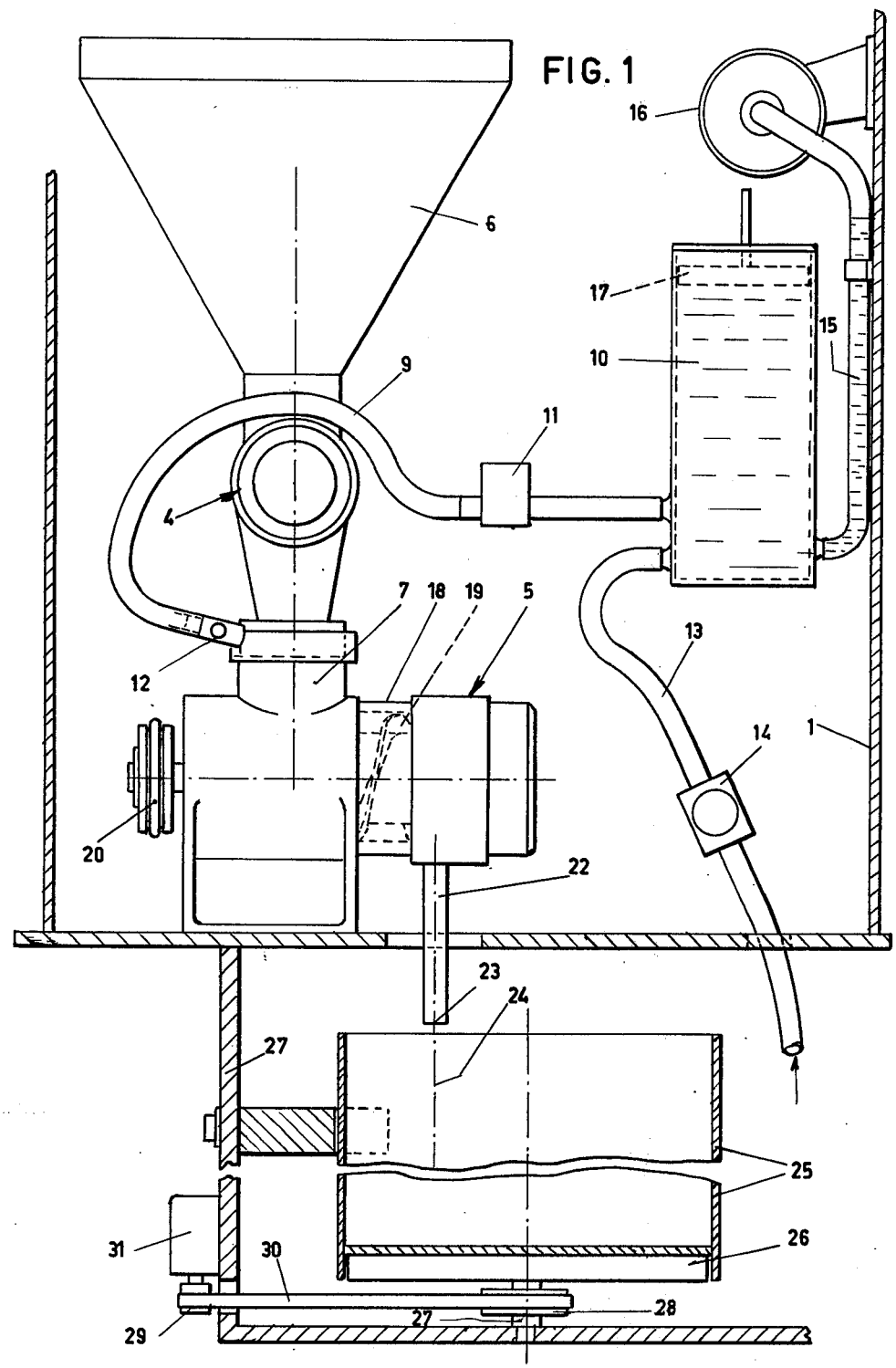

United States Patent [19]

Willemsen

[11] 4,026,335

[45] May 31, 1977

[54] ARRANGEMENT FOR PREPARING A DOUGH-LIKE MATERIAL

[76] Inventor: Willem Hendrik Willemsen, Westervalge 83, Warffum, Netherlands

[22] Filed: Apr. 22, 1975

[21] Appl. No.: 570,552

Related U.S. Application Data

[63] Continuation-in-part of Ser. No. 405,182, Oct. 10, 1973, abandoned.

[30] Foreign Application Priority Data

Oct. 13, 1972  Netherlands ..................... 7213867
Feb. 13, 1973  Netherlands ..................... 7301992

[52] U.S. Cl. ............................ 141/100; 141/250; 425/425; 425/435
[51] Int. Cl.² ...................... B65B 1/04; B29C 5/04
[58] Field of Search .......... 425/200, 205, 206, 208, 425/209, 425, 435; 141/34, 100, 250, 283

[56] References Cited

UNITED STATES PATENTS 2,026,624  1/1936  Flower ............................... 425/425
3,304,355  2/1967  Pobst et al. ........................ 425/200

FOREIGN PATENTS OR APPLICATIONS 977,349  3/1951  France ............................... 425/435
11,584  8/1902  Norway .............................. 141/34

Primary Examiner—Richard B. Lazarus
Assistant Examiner—William R. Briggs
Attorney, Agent, or Firm—Karl W. Flocks

[57] ABSTRACT

An arrangement for automatically filling cylindrical containers with a liquid mixture of a powdered material mainly consisting of a starch-containing powder, thickening agents and binders with a liquid in such a way that no separation of water will take place during the stiffening of said mixture into a dough-like material. According to the invention this is obtained by rotating said container during the filling thereof with a speed within the range of 1–15 revolutions per minute, and if necessary altering the quantities of powdered material and/or liquid of said mixture.

2 Claims, 2 Drawing Figures

ARRANGEMENT FOR PREPARING A DOUGH-LIKE MATERIAL

This application is a continuation-in-part of application Ser. No. 405,182 filed Oct. 10, 1973, and now abandoned.

This invention relates to an arrangement for automatically filling cylindrical containers with a dough-like material destined for the manufacture of so-called French potato fries, croquettes and similar fried products.

When making dough-like material of this kind a quantity of said powdered material was charged into a container whereafter a quantity of liquid, preferably water, was added to said powdered material and the powdered material and the water were stirred until a liquid mixture of said powdered material and the water was obtained. After having obtained this liquid mixture it was no longer stirred, whereafter it stiffened into a dough-like material in a short time.

When using the dough-like material obtained in this way for frying helpings of French "potato" sticks it appeared that some of the fried sticks of such helpings were too hard whereas some other sticks were not fried hard enough and were more or less cooked, notwithstanding the fact that said sticks were made of a quantity of dough-like material taken out of one and the same container in which it was made.

After many experiments it was found by the inventor that the phenomenon of sticks which were fried too hard and of sticks which were more or less cooked was due to the fact that the sticks which were fried too hard did not contain enough water before frying whereas sticks which were more or less cooked contained too much water before being fried so that during the mixing of the powdered material and the water a quantity of said powdered material had obtained too much water and a quantity of said material had obtained insufficient water.

According to the invention this disadvantage is avoided in that the arrangement according to the invention comprises a tank, containing a powdered material, mainly consisting of a starch-containing powder, thickening agents and binders, a mixing device for thoroughly mixing said powdered material with a liquid so that a mixture of said powdered material and the liquid in a liquid state is obtained, said mixing device having a feeding device supplying continuously a same amount of powdered material via an inlet conduit means and a feeding device supplying continuously a same amount of liquid to said mixing device, said mixing device being provided with a discharge conduit means for continuously feeding said mixture in liquid state to a cylindrical container to be filled, said discharge conduit having an outlet opening located above said cylindrical container lying substantially on a vertical line passing through the middle of a radius of said cylindrical container, said cylindrical container resting on a support provided with adjustable driving means for rotating said support with a speed in the range of 1–15 revolutions per minute, the constituents of the powdered material and the liquid being chosen in such a way that said mixture stiffens when being fed into the container into layers having a surface area corresponding with a part of the cross-sectional area of said container.

The mixture which first has reached the bottom of the container first begins to stiffen. During said stiffening process the liquid mixture expands to a dough-like material. Since the container rotates continuously and the fluid material is fed continuously with the same quantity to the container the possibility that some powdered material will take up too much water out of a liquid mixture which is subsequently fed to the container is substantially avoided since the bottom of the container receives a substantially equal quantity of liquid mixture and the liquid material which is first fed into the container is already stiffened to a dough-like material before a next quantity of liquid mixture is fed onto said stiffened material. This feeding process takes place until the container is filled completely.

In case it would appear that still a separation of water would take place the rotation speed of the container may be reduced so that there is a longer time available for the quantities of mixture to stiffen and to take up the total quantity of water which is contained in the mixture.

A favourable embodiment of the arrangement according to the invention is characterized in that the feeding device for supplying an amount of powdered material and the device for supplying an amount of liquid to the mixing device are provided with means for adjustable controlling the amounts of powdered material and liquid fed to the mixing device. By means of this arrangement it is possible to alter the quantities of powdered material and liquid before feeding them into the mixing device so that powdered materials having different constituents may be used. Another advantage of this arrangement is that in case it would appear that by reducing the speed of the disc it is not possible to avoid a complete separation of liquid during the stiffening of the material it is possible to feed more powdered material or less liquid to the mixing device whereby no liquid separation will take place.

The invention will be further explained below with references to the drawings showing diagrammatically and by way of example two embodiments of the arrangement according to the invention.

The drawings show in

Figure 2:
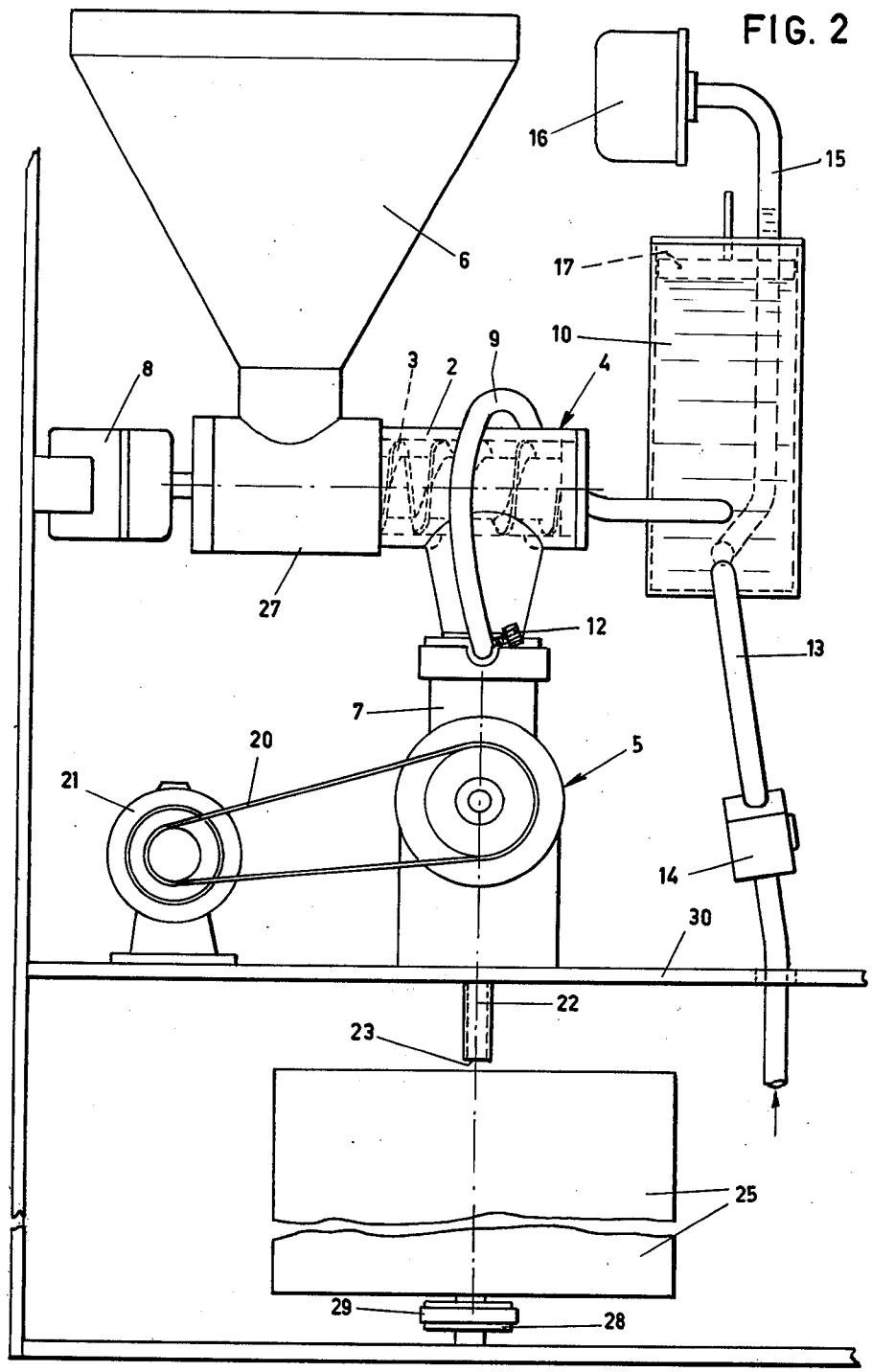

FIG. 1 a side view of said arrangement;

FIG. 2 a front view of said arrangement.

The arrangement shown in the FIGS. 1 and 2 comprises a frame 1 in which there is mounted a feeding device 4 consisting of a worm 3 provided in a housing 2 and destined to supply a powdered material to a mixing device 5. This powdered material is contained in a hopper-like reservoir 6 which by means of a conduit 7 is connected to the feeding device 4. The powdered material mainly consists of a mixture of a powder containing starch, thickening agents and binders. Such materials are generally available on the market.

The feeding device 4 for feeding the powdered material to the mixing device 5 is connected to the latter by means of a vertical channel 7 and is driven by a motor 8 such that always the same amount of powdered material is continuously supplied to said vertical channel 7.

The amount of liquid, in this case water, required for forming the dough is supplied to said vertical channel 7 through a conduit 9 which on the one hand is connected to a water reservoir 10 and on the other hand to said vertical channel 7. In said conduit 9 there are provided a low pressure valve 11 and a screw 12 for the fine adjustment of the amount of water supplied to the vertical channel 7.

The water reservoir 10 is connected at its bottom to a water mains (not shown) by a conduit 13 in which a high pressure magnet valve 14 is provided. The water reservoir is furthermore connected by a conduit 15 to a level switch 16 which closes the high pressure magnet valve 14 when the water in the water reservoir 10 has reached the highest level and opens said valve 14 when the water in the water reservoir has reached its lowest level. For this purpose a float or piston 17 is provided in the reservoir 10. The difference between the highest and lowest level in the water reservoir is selected such that it amounts to about 2 to 2.5 cm. The result is the pressure of the water supplied by the water reservoir 10 via the conduit 9 to the mixing device 5 only slightly changes independently of the pressure differences or pressure thrusts occurring in the water line so that consequently an almost constant amount of water flows without interruption through the line 9 to the mixing device 5. Said mixing device 5 comprises a housing 18 in which a worm 19 is provided which is driven at a constant speed via a transmission 20 by a motor 21. In said mixing device the powdered material and the water, which is previously heated to 15°-25° C, are mixed, the mixing time being selected such that the mixture obtained is dispensed in liquid condition, therefore before it stiffens to a dough, with a constant quantity to the discharge conduit 22 of the mixing device 5. Said discharge conduit having a round outlet opening 23 the centre of which lying on a vertical line 24 passing through the circumference of a circle having a radius equal to the half of the radius of the cylindrical container 25 to be filled. Said discharge opening being positioned above a removable cylindrical dough receiving container 25 arranged below said outlet opening 23.

Said receiving container 25 is placed on a disc 26 which is provided with a shaft 27. Said shaft is driven by means of pulleys 28 and 29 and a belt 30 by a drive mechanism 31 which may adjusted in such a way that is may drive the disc 26 with a constant speed within the speeds lying in the range of 1–15 revolutions per minute.

As a result of the rotation of the disc 26 the receiving container 25 is rotated with the same speed as said disc and the liquid mixture flowing out of the nozzle 22 is each time fed to a subsequent part of the bottom of the receiving container 25 or to the layers already present in the receiving container so that consequently the previously supplied portions are only partly covered by the next portion. This means that the said non-covered portion during the time that it stiffens is substantially not influenced by the fluid mixture subsequently introduced into the receiving container.

To the arrangement described in the preceding text there was supplied per minute 830 g of powdered material of the afore-described kind and 1320 g of water. The liquid mixture formed in the mixing device 5 flows through the discharge opening 23 having a diameter of about 7 mm into the dough receiving container 25 having a diameter of 200 mm.

It is obvious that the invention is not restricted to the embodiment of the arrangement according to the invention as described in the preceding test and shown in the drawings, but that it may be modified in many ways without departing from the scope of the invention. Instead of the belt drive shown the disc 26 may be driven by any other known driving system, for example by a gear wheel transmission, and the mixture supplied to the receiving container may be prepared in any other way.

I claim:

1. An arrangement for automatically filling cylindrical containers with a dough-like material destined for the manufacture of so-called French potato fries, croquettes and similar fried products, said arrangement comprising a tank containing a powdered material, mainly consisting of a starch-containing powder, thickening agents and binders, a continuously driven mixing device for thoroughly mixing said powdered material with a liquid delivered by a liquid feeding device, said liquid feeding device delivering such a quantity of liquid to said mixing device so that a mixture of said powdered material and the liquid in a liquid state is obtained, said mixing device having an inlet conduit means connected to said tank for the powdered material, said continuously driven mixing device being provided with a discharge conduit means feeding said mixture in liquid state to a cylindrical container to be filled, said discharge conduit having an outlet opening, the center of said outlet opening being located above said cylindrical container and lying substantially at a point on a vertical line passing through the middle of a radius midway between the center axis and the edge of said cylindrical container, said cylindrical container resting on a rotatably mounted support, adjustable driving means rotating said support, said driving means being operable to rotate said support at a speed in the range of 1–15 revolutions per minute.

2. An arrangement according to claim 1, further characterized by means for continuous feeding of an amount of powdered material from said tank to said mixing device, and said liquid feeding device being adjustable as to liquid fed to said mixing device.

* * * * *